United States Patent
Ikeda et al.

(10) Patent No.: US 9,670,408 B2
(45) Date of Patent: Jun. 6, 2017

(54) OXYGEN ABSORBENT COMPOSITION AND MOLDED BODY AND PACKAGE USING THE SAME

(71) Applicant: MITSUBISHI GAS CHEMICAL COMPANY, INC., Tokyo (JP)

(72) Inventors: Shinichi Ikeda, Tokyo (JP); Satoshi Okada, Kanagawa (JP); Shinpei Iwamoto, Kanagawa (JP); Fumihiro Ito, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 1 day.

(21) Appl. No.: 14/766,506

(22) PCT Filed: Mar. 6, 2014

(86) PCT No.: PCT/JP2014/055876
§ 371 (c)(1),
(2) Date: Aug. 7, 2015

(87) PCT Pub. No.: WO2014/136917
PCT Pub. Date: Sep. 12, 2014

(65) Prior Publication Data
US 2016/0009993 A1   Jan. 14, 2016

(30) Foreign Application Priority Data

Mar. 6, 2013 (JP) .................. 2013-044756

(51) Int. Cl.

| | | |
|---|---|---|
| *C09K 15/20* | (2006.01) | |
| *A23L 3/3436* | (2006.01) | |
| *C08L 101/00* | (2006.01) | |
| *B01D 53/02* | (2006.01) | |
| *C08K 5/3432* | (2006.01) | |
| *B32B 27/08* | (2006.01) | |
| *B32B 27/18* | (2006.01) | |
| *B32B 27/32* | (2006.01) | |
| *B32B 27/34* | (2006.01) | |
| *B32B 27/36* | (2006.01) | |
| *B01J 20/30* | (2006.01) | |
| *B01J 20/32* | (2006.01) | |
| *B65D 81/26* | (2006.01) | |

(52) U.S. Cl.
CPC ............ *C09K 15/20* (2013.01); *A23L 3/3436* (2013.01); *B01D 53/02* (2013.01); *B01J 20/3007* (2013.01); *B01J 20/3204* (2013.01); *B01J 20/3255* (2013.01); *B32B 27/08* (2013.01); *B32B 27/18* (2013.01); *B32B 27/32* (2013.01); *B32B 27/325* (2013.01); *B32B 27/327* (2013.01); *B32B 27/34* (2013.01); *B32B 27/36* (2013.01); *B65D 81/266* (2013.01); *C08K 5/3432* (2013.01); *C08L 101/00* (2013.01); *B01D 2253/20* (2013.01); *B01D 2253/202* (2013.01); *B01D 2253/25* (2013.01); *B01D 2255/20746* (2013.01); *B01D 2257/104* (2013.01); *B32B 2250/00* (2013.01); *B32B 2250/02* (2013.01); *B32B 2250/05* (2013.01); *B32B 2250/24* (2013.01); *B32B 2250/242* (2013.01); *B32B 2307/7244* (2013.01); *B32B 2553/00* (2013.01)

(58) Field of Classification Search
CPC ....... A23L 3/3436; C09K 15/06; C09K 15/22; C09K 15/30
See application file for complete search history.

(56) References Cited

U.S. PATENT DOCUMENTS

| | | | |
|---|---|---|---|
| 5,346,644 A | 9/1994 | Speer et al. | |
| 2008/0277622 A1 | 11/2008 | Deshpande et al. | |
| 2013/0023609 A1 | 1/2013 | Menozzi et al. | |
| 2014/0225034 A1 | 8/2014 | Okada et al. | |
| 2015/0232251 A1* | 8/2015 | Ikeda ................... | B65D 81/268 206/0.7 |

FOREIGN PATENT DOCUMENTS

| | | |
|---|---|---|
| CN | 104582831 | 4/2015 |
| JP | 51-136845 | 11/1976 |
| JP | 5-115776 | 5/1993 |
| JP | 9-234832 | 9/1997 |
| JP | 2001-252560 | 9/2001 |
| JP | 2003-521552 | 7/2003 |
| JP | 2010-527389 | 8/2010 |
| JP | 2013-040147 | 2/2013 |
| WO | 99/48963 | 9/1999 |
| WO | 2011/067197 | 6/2011 |
| WO | 2013/031877 | 3/2013 |
| WO | 2014/034800 | 3/2014 |

OTHER PUBLICATIONS

Search Report issued in PCT/JP2014/055876, dated May 27, 2014.

* cited by examiner

*Primary Examiner* — Peter F Godenschwager
(74) *Attorney, Agent, or Firm* — Greenblum & Bernstein, P.L.C.

(57) ABSTRACT

The provision of an oxygen absorbent composition comprising a compound (A) having two or more tetralin rings, at least one of the tetralin rings having a hydrogen bond bonded to a benzylic position thereof, and having two or more imide bonds, and a transition metal catalyst.

9 Claims, No Drawings

OXYGEN ABSORBENT COMPOSITION AND MOLDED BODY AND PACKAGE USING THE SAME

TECHNICAL FIELD

The present invention relates to an oxygen absorbent composition and a molded body and a package using the same.

BACKGROUND ART

For the purpose of preventing the oxygen oxidation of various articles that deteriorate or degrade easily under the influence of oxygen, typified by foods, drinks, medicines, cosmetics, and the like, and storing them for a long period, oxygen absorbents for removing oxygen in packages housing these are used.

As the oxygen absorbent, an oxygen absorbent comprising an iron powder as a reaction basis is generally used in terms of oxygen absorption ability, ease of handling, and safety. But, this iron-based oxygen absorbent responds to a metal detector, and therefore, it is difficult to use a metal detector for foreign matter inspection. In addition, a package enclosing the iron-based oxygen absorbent cannot be heated by a microwave oven because of the risk of ignition. Further, the oxidation reaction of the iron powder is utilized, and therefore, the oxygen absorption effect can be exhibited only for objects to be stored that are of a high moisture type.

In addition, a packaging container is developed in which the container is composed of a multilayer material in which an oxygen-absorbing layer comprising an oxygen-absorbing resin composition obtained by blending an iron-based oxygen absorbent with a thermoplastic resin is disposed, and thus, an improvement in the gas barrier properties of the container is promoted, and an oxygen absorption function is provided to the container itself (see Patent Literature 1). But, similarly, problems of the packaging container are such that it cannot be used for a metal detector, cannot be heated by a microwave oven, and exhibits the effect only for objects to be stored that are of a high moisture type. A further problem is such that the internal visibility is insufficient due to the problem of opacity.

From the circumstances as described above, an oxygen absorbent comprising an organic substance as a reaction basis is desired. As the oxygen absorbent comprising an organic substance as a reaction basis, an oxygen absorbent comprising ascorbic acid as a basis is known (see Patent Literature 2).

On the other hand, an oxygen-absorbing resin composition comprising a resin and a transition metal catalyst and having oxygen trapping properties is known. For example, a resin composition comprising a polyamide, particularly a xylylene group-containing polyamide, as an oxidizable organic component and a transition metal catalyst is known, and further, there are also illustrations of a resin composition having an oxygen trapping function, an oxygen absorbent obtained by molding the resin composition, a packaging material, and a multilayer laminated film for packaging (see Patent Literature 3).

In addition, as an oxygen-absorbing resin composition that does not require moisture for oxygen absorption, an oxygen-absorbing resin composition comprising a resin having a carbon-carbon unsaturated bond and a transition metal catalyst is known (see Patent Literature 4).

Further, as a composition for collecting oxygen, a composition comprising a polymer comprising a substituted cyclohexene functional group or a low molecular weight substance to which the cyclohexene ring is bonded and a transition metal is known (see Patent Literature 5).

PATENT LITERATURE

Patent Literature 1: Japanese Patent Laid-Open No. 09-234832
Patent Literature 2: Japanese Patent Laid-Open No. 51-136845
Patent Literature 3: Japanese Patent Laid-Open No. 2001-252560
Patent Literature 4: Japanese Patent Laid-Open No. 05-115776
Patent Literature 5: National Publication of International Patent Application No. 2003-521552

SUMMARY OF THE INVENTION

Problems to be Solved by the Invention

However, problems of the oxygen absorbent composition of Patent Literature 2 are such that it has low oxygen absorption performance in the first place and exhibits the effect only for objects to be stored that are of a high moisture type, and is relatively expensive.

In addition, the resin composition of Patent Literature 3 exhibits the oxygen absorption function by containing the transition metal catalyst to oxidize the xylylene group-containing polyamide resin, and therefore, a problem is that strength decrease due to the oxidative degradation of the resin occurs, and the strength of the packaging container itself decreases. Further problems of this resin composition are such that it still has insufficient oxygen absorption performance and exhibits the effect only for objects to be stored that are of a high moisture type.

Further, a problem of the oxygen-absorbing resin composition of Patent Literature 4 is that a low molecular weight organic compound, which is an odor component, is produced due to the cutting of the polymer chain accompanying the oxidation of the resin, and the intensity of the odor increases after oxygen absorption.

On the other hand, problems of the composition of Patent Literature 5 are that it is necessary to use a special material comprising a cyclohexene functional group, and this material relatively easily produces an odor and further is relatively expensive.

In addition, another problem is such that when a conventional oxygen absorbent composition is blended with a resin or the like and used, the oxygen absorption ability decreases due to a thermal history during molding or the like. Therefore, another problem is such that when molding processing is performed using a resin composition in which an oxygen absorbent composition is blended, or the like, it is subject to the limitation of heating conditions and the like.

The present invention has been made in view of the above problems, and it is an object of the present invention to provide an oxygen absorbent composition and a molded body and a package using the same that have excellent oxygen absorption performance under a wide range of humidity conditions from low humidity to high humidity, do not have decreased oxygen absorption performance even after being subjected to a thermal history, and have no odor before and after oxygen absorption.

Means for Solving the Problems

The present inventors have diligently advanced the study of various oxygen absorbent compositions in order to solve such problems, and as a result, found that the above problems are solved by using a predetermined compound having a tetralin ring and a transition metal catalyst, and completed the present invention.

Specifically, the present invention is as follows.
[1] An oxygen absorbent composition comprising
a compound (A) having two or more tetralin rings, at least one of the tetralin rings having a hydrogen atom bonded to a benzylic position thereof, and having two or more imide bonds, and
a transition metal catalyst.
[2] The oxygen absorbent composition according to [1], wherein the compound (A) is at least one compound selected from a group consisting of the following general formulas (1) to (4):

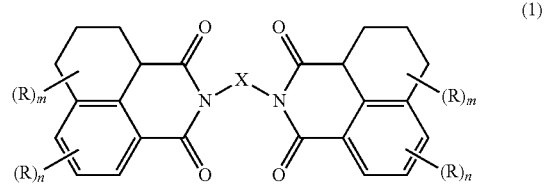
(1)

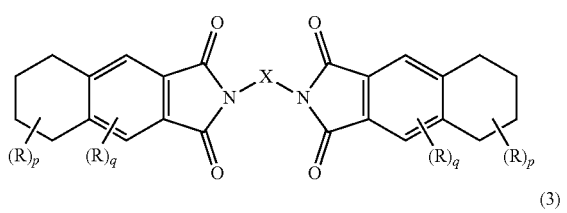
(2)

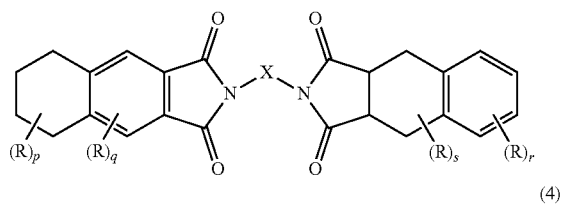
(3)

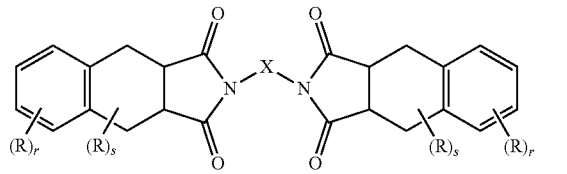
(4)

wherein R each independently represents a hydrogen atom or a monovalent substituent, the monovalent substituent is at least one selected from a group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, and an imide group, and R may further have a substituent; m represents an integer of 0 to 6, n represents an integer of 0 to 3, p represents an integer of 0 to 7, q represents an integer of 0 to 2, r represents an integer of 0 to 4, s represents an integer of 0 to 5, and in at least one tetralin ring, one or more hydrogen atoms are bonded to a benzylic position thereof; and X represents a divalent substituent, and the divalent substituent is at least one selected from a group consisting of an aromatic hydrocarbon group, a saturated or unsaturated alicyclic hydrocarbon group, a linear or branched, saturated or unsaturated aliphatic hydrocarbon group, and a heterocyclic group.
[3] The oxygen absorbent composition according to [1] or [2] further comprising a support substance.
[4] The oxygen absorbent composition according to [3], wherein the support substance is at least one selected from a group consisting of calcium silicate, diatomaceous earth, silica, and activated carbon.
[5] The oxygen absorbent composition according to [3] or [4], wherein 10 to 1000 parts by mass of the support substance is contained based on 100 parts by mass of the compound (A).
[6] The oxygen absorbent composition according to any one of [1] to [5], wherein the transition metal catalyst comprises at least one transition metal selected from a group consisting of manganese, iron, cobalt, nickel, and copper.
[7] The oxygen absorbent composition according to any one of [1] to [6], wherein the transition metal catalyst is contained with an amount of the transition metal being 0.001 to 10 parts by mass based on 100 parts by mass of the compound (A).
[8] The oxygen absorbent composition according to any one of [1] to [7] further comprising a thermoplastic resin.
[9] A molded body comprising the oxygen absorbent composition according to [8].
[10] A package obtained by packaging the oxygen absorbent composition according to any one of [1] to [8] in an air-permeable packaging material.

Advantageous Effects of the Invention

According to the present invention, it is possible to realize an oxygen absorbent composition and a molded body and a package using the same that have excellent oxygen absorption performance under a wide range of humidity conditions from low humidity to high humidity, do not have decreased oxygen absorption performance even after being subjected to a thermal history, and have no odor before and after oxygen absorption.

MODES FOR CARRYING OUT THE INVENTION

A mode for carrying out the present invention (hereinafter simply referred to as "this embodiment") will be described in detail below. This embodiment below is an illustration for describing the present invention and is not intended to limit the present invention to the following contents. Appropriate modifications can be made to the present invention without departing from the spirit thereof.

An oxygen absorbent composition in this embodiment is an oxygen absorbent composition containing a compound (A) having two or more tetralin rings, at least one of the above tetralin rings having a hydrogen bond bonded to the benzylic position thereof, and having two or more imide bonds, and a transition metal catalyst.

By containing the compound (A) and the transition metal catalyst, the oxygen absorbent composition in this embodiment has excellent oxygen absorption performance under a wide range of humidity conditions from low humidity to high humidity and can suppress also an increase in odor intensity after oxygen absorption. Their action is not certain, but first, it is considered that the transition metal catalyst functions as a catalyst for the oxidation reaction of the compound (A), and thus, excellent oxygen absorption performance can be exerted. Further, it is considered that the suppression of an increase in odor intensity after oxygen absorption is due to the fact that in this oxidation reaction mechanism, the hydrogen atom at the benzylic position of at least one tetralin ring of the compound (A) is abstracted, and thus, a radical is produced, and the carbon at the benzylic position is oxidized by the reaction of the radical with oxygen to produce a hydroxy group or a ketone group. In other words, it is presumed that the suppression of an increase in odor intensity after oxygen absorption is due to the fact that the cutting of the molecular chain due to the oxidation reaction does not occur, and the structure of the compound (A) is maintained, and therefore, the production of a low molecular weight organic compound, which can be a cause of the odor, can be suppressed.

<Compound (A)>

The compound (A) is a compound having two or more tetralin rings, at least one of the tetralin rings having a hydrogen atom bonded to the benzylic position thereof, and having two or more imide bonds. First, the compound (A) has two or more tetralin rings, and thus, many reaction points with oxygen per molecule of the compound (A) can be contained. Further, the compound (A) has two imide bonds having high polarity, and therefore, strong intermolecular force can be obtained. It is presumed that as a result, the oxygen absorbent composition has excellent heat resistance, and can maintain high oxygen absorption performance even after being subjected to a thermal history.

The compound (A) is preferably at least one selected from the group consisting of the following general formulas (1) to (4):

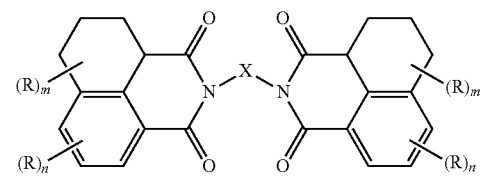
(1)

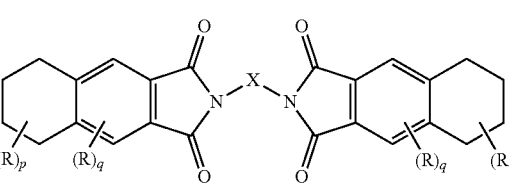
(2)

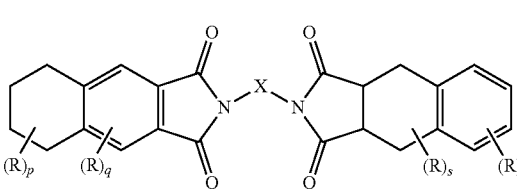
(3)

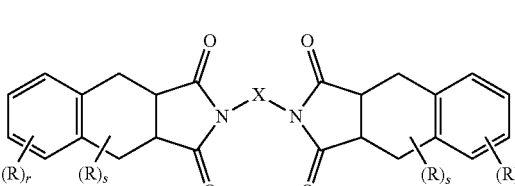
(4)

wherein R each independently represents a hydrogen atom or a monovalent substituent, the above monovalent substituent is at least one selected from the group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, and an imide group, and R may further have a substituent; m represents an integer of 0 to 6, n represents an integer of 0 to 3, p represents an integer of 0 to 7, q represents an integer of 0 to 2, r represents an integer of 0 to 4, s represents an integer of 0 to 5, and in at least one tetralin ring, one or more hydrogen atoms are bonded to the benzylic position thereof; and X represents a divalent substituent, and the above divalent substituent is at least one selected from the group consisting of an aromatic hydrocarbon group, a saturated or unsaturated alicyclic hydrocarbon group, a linear or branched, saturated or unsaturated aliphatic hydrocarbon group, and a heterocyclic group.

As the compound (A), a compound represented by at least any selected from the group consisting of the following general formulas (5) to (8) is more preferred.

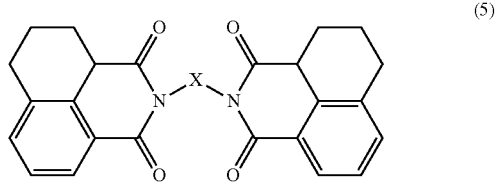
(5)

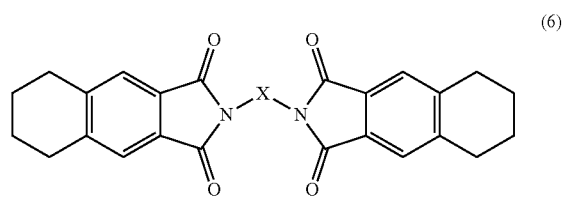
(6)

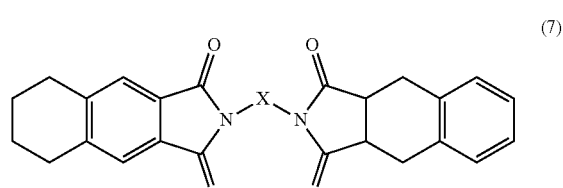
(7)

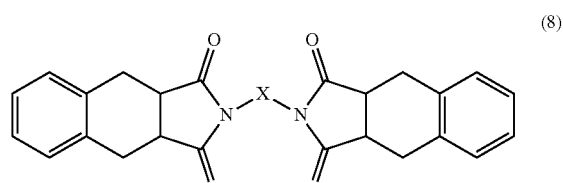
(8)

Preferred specific examples of the above general formula (5) are shown below but are not limited to these.

(9)
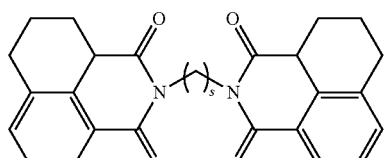
s = 1~10

(10)
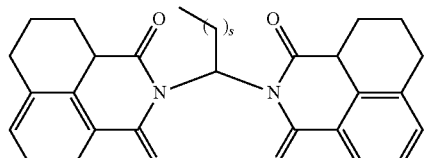
s = 1~8

(11)
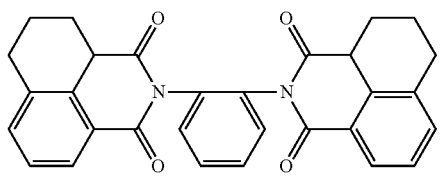

(12)
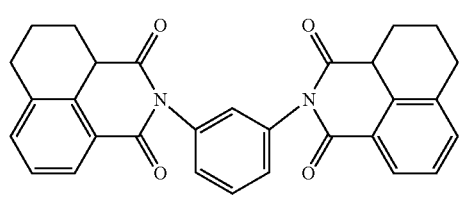

(13)
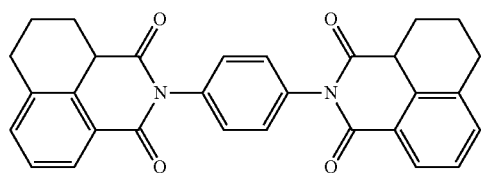

s in formula (9) represents an integer of 1 to 10, and s in formula (10) represents an integer of 1 to 8.

Preferred specific examples of the above general formula (6) are shown below but are not limited to these.

(14)
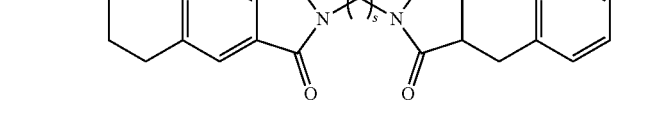
s = 1~10

(15)
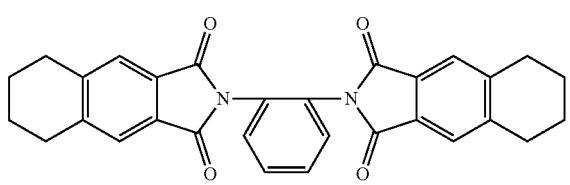

(16)
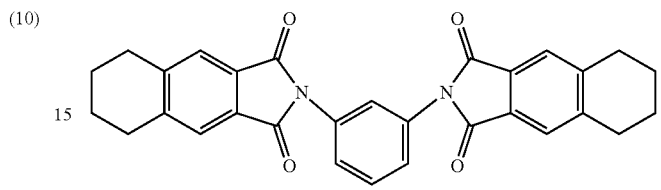

(17)
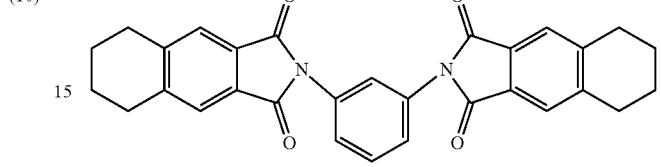

s in formula (14) represents an integer of 1 to 10.

Preferred specific examples of the above general formula (7) are shown below but are not limited to these.

(18)
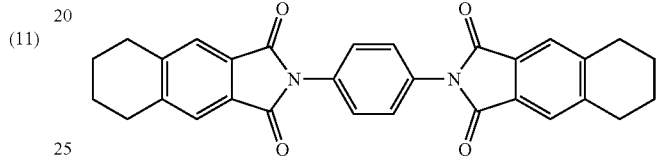
s = 1~10

(19)
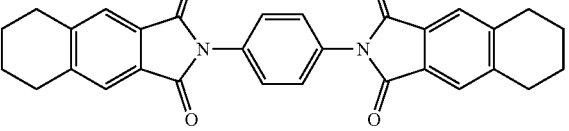

(20)
(21)

s in formula (18) represents an integer of 1 to 10.

Preferred specific examples of the above general formula (8) are shown below but are not limited to these.

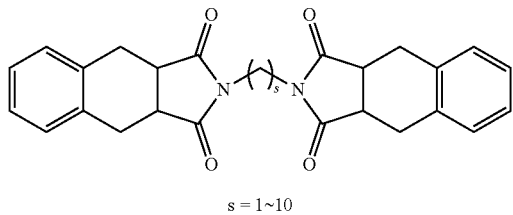

(22)

s = 1~10

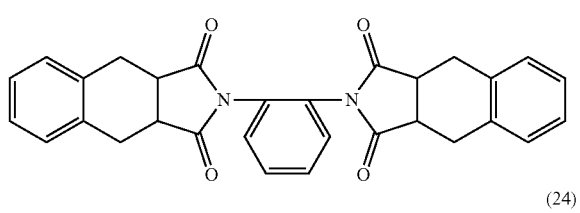

(23)

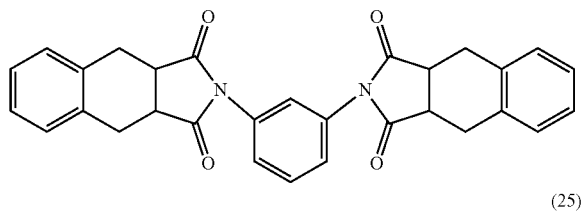

(24)

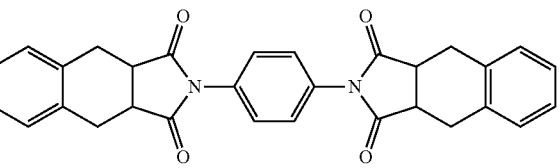

(25)

s in formula (22) represents an integer of 1 to 10.

In the above, mainly, as a compound having two tetralin rings and having two imide bonds, the above general formulas (5) to (25) have been illustrated, but compounds having three or more tetralin rings and compounds having three or more imide bonds are also included in this embodiment.

The molecular weight of the compound (A) is not particularly limited but is preferably 414 to 1000, more preferably 430 to 800, and further preferably 450 to 600. When the molecular weight is 414 or more, the loss due to volatilization during use can be even more suppressed. When the molecular weight is 1000 or less, the oxygen absorption ability is even more improved.

For the compound (A), those having a high boiling point, and having low vapor pressure at the temperature during use are preferred because the loss due to volatilization during use can be even more suppressed. In addition, when the oxygen absorbent composition in this embodiment comprises a thermoplastic resin described later, the compound (A) preferably has low vapor pressure at the temperature of kneading with the thermoplastic resin. In addition, the compound (A) preferably has higher 3% weight decrease temperature. The 3% weight decrease temperature is not particularly limited but is preferably 150° C. or more, more preferably 200° C. or more, further preferably 250° C. or more, and still further preferably 270° C. or more.

The method for producing the compound (A) is not particularly limited, and the compound (A) can also be produced, for example, by a known method. For example, the compound (A) can be obtained by reacting a diamine compound with an acid anhydride compound.

<Transition Metal Catalyst>

The transition metal catalyst used in the oxygen absorbent composition in this embodiment can also be appropriately selected from known ones and used and is not particularly limited as long as it can function as a catalyst for the oxidation reaction of the above compound (A).

Specific examples of such a transition metal catalyst may include organic acid salts, halides, phosphates, phosphites, hypophosphites, nitrates, sulfates, oxides, and hydroxides of transition metals. Here, examples of the transition metal contained in the transition metal catalyst may include, but are not limited to, titanium, vanadium, chromium, manganese, iron, cobalt, nickel, copper, zinc, ruthenium, and rhodium. Among these, manganese, iron, cobalt, nickel, and copper are preferred. In addition, examples of the organic acid may include, but are not limited to, acetic acid, propionic acid, octanoic acid, lauric acid, stearic acid, acetylacetone, dimethyldithiocarbamic acid, palmitic acid, 2-ethylhexanoic acid, neodecanoic acid, linoleic acid, tall oil acid, oleic acid, capric acid, and naphthenic acid. For the transition metal catalyst, combinations of these transition metals and organic acids are preferred, and combinations in which the transition metal is manganese, iron, cobalt, nickel, or copper, and the organic acid is acetic acid, stearic acid, 2-ethylhexanoic acid, oleic acid, or naphthenic acid are more preferred. One transition metal catalyst can be used alone, or two or more transition metal catalysts can be used in combination.

The amount of the transition metal catalyst blended can be appropriately set according to the types of the compound (A) and the transition metal catalyst used and the desired performance and is not particularly limited. In terms of the amount of oxygen absorbed by the oxygen absorbent composition, for the amount of the transition metal catalyst blended, the amount of the transition metal is preferably 0.001 to 10 parts by mass, more preferably 0.005 to 2 parts by mass, and further preferably 0.01 to 1 part by mass based on 100 parts by mass of the compound (A).

Here, the oxygen absorbent composition used in this embodiment preferably further contains a support substance as required. At this time, the oxygen absorbent composition containing the support substance can also be used as an oxygen absorbent as a mixture of the above compound (A), the transition metal catalyst, and the support substance as it is. In addition, by supporting or impregnating the above-described compound (A) on or into the support substance together with the transition metal catalyst as required, a support in which the compound (A) is supported on or impregnated into the support substance (hereinafter also referred to as an "oxygen absorbent support") can be provided, and this support can also be used as an oxygen absorbent. By supporting or impregnating the compound (A) on or into the support substance in this manner, the contact area with oxygen can be increased to increase the oxygen absorption rate or the amount of oxygen absorbed, and further, the handling can be even more simplified.

The above support substance can also be appropriately selected from among those known in the industry and used. Specific examples thereof may include, but are not particularly limited to, powders of calcium silicate, slaked lime, activated carbon, zeolite, pearlite, diatomaceous earth, activated clay, silica, kaolin, talc, bentonite, activated alumina, gypsum, silica alumina, calcium silicate, magnesium oxide, graphite, carbon black, aluminum hydroxide, iron oxide, and the like. Among these, the above support substance is preferably at least one selected from the group consisting of calcium silicate, diatomaceous earth, silica, and activated carbon. One support substance can be used alone, or two or more support substances can be used in combination.

The amount of the support substance blended can be appropriately set according to the types of the compound (A) and the transition metal catalyst used and the desired performance and is not particularly limited, but is preferably 10 to 1000 parts by mass, more preferably 20 to 800 parts by mass, based on 100 parts by mass of the compound (A).

The support of the compound (A) on the support substance can be performed according to an ordinary method and is not particularly limited. For example, an oxygen absorbent support in which the compound (A) (and the transition metal catalyst as required) is supported on (impregnated into) the support substance can be obtained by preparing a liquid mixture containing the above-described compound (A) or a liquid mixture containing the compound (A) and the transition metal catalyst, and applying this liquid mixture to the support substance or immersing the support substance in this liquid mixture, or the like. During the preparation of the liquid mixture, a solvent can be further contained. When the compound (A) and the transition metal catalyst are solid, these can be efficiently supported on the support substance by using a solvent. The solvent used here can also be appropriately selected from among known ones and used considering the solubility of the compound (A) and the transition metal catalyst, and the like, and is not particularly limited. For example, organic solvents such as methanol, 2-propanol, ethylene glycol, toluene, xylene, methyl acetate, ethyl acetate, butyl acetate, diisopropyl ether, tetrahydrofuran, methyl ethyl ketone, dichloromethane, and chloroform are preferred, and methanol, 2-propanol, ethyl acetate, and methyl ethyl ketone are more preferred. One solvent can be used alone, or two or more solvents can be used in combination.

<Thermoplastic Resin>

By blending a thermoplastic resin into the oxygen absorbent composition in this embodiment, an oxygen-absorbing resin composition can also be provided. At this time, the form of the compound (A) and the transition metal catalyst contained in the oxygen absorbent composition is not particularly limited. For example, the compound (A) and the transition metal catalyst may be contained in the thermoplastic resin as they are, or the compound (A) and the transition metal catalyst may be contained in the thermoplastic resin in a state of being supported on the above-described support substance.

As the above thermoplastic resin, a known one can be appropriately used, and the above thermoplastic resin is not particularly limited. Examples thereof may include polyolefins such as low density polyethylene, medium density polyethylene, high density polyethylene, linear low density polyethylene, linear ultralow density polyethylene, polypropylene, poly-1-butene, poly-4-methyl-1-pentene, or random or block copolymers of α-olefins such as ethylene, propylene, 1-butene, and 4-methyl-1-pentene; acid-modified polyolefins such as maleic anhydride-grafted polyethylene and maleic anhydride-grafted polypropylene; ethylene-vinyl compound copolymers such as ethylene-vinyl acetate copolymers, ethylene-vinyl alcohol copolymers, ethylene-vinyl chloride copolymers, ethylene-(meth)acrylic acid copolymers and ionically crosslinked products thereof (ionomers), and ethylene-methyl methacrylate copolymers; styrene-based resins such as polystyrene, acrylonitrile-styrene copolymers, and α-methylstyrene-styrene copolymers; polyvinyl compounds such as polymethyl acrylate and polymethyl methacrylate; polyamides such as nylon 6, nylon 66, nylon 610, nylon 12, and poly(meta-xylylene adipamide) (MXD6); polyesters such as polyethylene terephthalate (PET), polybutylene terephthalate (PBT), polytrimethylene terephthalate (PTT), polyethylene naphthalate (PEN), glycol-modified polyethylene terephthalate (PETG), polyethylene succinate (PES), polybutylene succinate (PBS), polylactic acid, polyglycolic acid, polycaprolactone, and polyhydroxyalkanoates; polycarbonates; polyethers such as polyethylene oxide; or mixtures thereof. One thermoplastic resin can be used alone, or two or more thermoplastic resins can be used in combination.

Among these, the thermoplastic resin is preferably at least one selected from the group consisting of polyolefins, polyesters, polyamides, ethylene-vinyl alcohol copolymers, plant-derived resins, and chlorine-containing resins and is more preferably at least one selected from the group consisting of polyolefins, polyesters, polyamides, ethylene-vinyl alcohol copolymers, and chlorine-containing resins. These preferred thermoplastic resins will be described in detail below.

<Polyolefin>

Examples of the polyolefin used in the oxygen absorbent composition in this embodiment may include olefin homopolymers such as polyethylene such as low density polyethylene, medium density polyethylene, high density polyethylene, linear low density polyethylene, and linear ultralow density polyethylene, polypropylene, polybutene-1, and poly-4-methylpentene-1; copolymers of ethylene and α-olefins such as ethylene-propylene random copolymers, ethylene-propylene block copolymers, ethylene-propylene-polybutene-1 copolymers, and ethylene-cyclic olefin copolymers; other ethylene copolymers such as ethylene-α,β-unsaturated carboxylic acid copolymers such as ethylene-(meth)acrylic acid copolymers, ethylene-α,β-unsaturated carboxylate copolymers such as ethylene-ethyl (meth)acrylate copolymers, ionically crosslinked products of ethylene-α,β-unsaturated carboxylic acid copolymers, and ethylene-vinyl acetate copolymers; cyclic olefin ring-opening polymers and hydrogenated products thereof; cyclic olefin-ethylene copolymers; and graft-modified polyolefins obtained by graft-modifying these polyolefins with acid anhydrides such as maleic anhydride or the like.

<Polyester>

Examples of the polyester used in the oxygen absorbent composition in this embodiment may include those comprising one or two or more selected from polyvalent carboxylic acids including dicarboxylic acids and ester-forming derivatives thereof and one or two or more selected from polyhydric alcohols including glycols, or those comprising hydroxycarboxylic acids and ester-forming derivatives thereof, or those comprising cyclic esters. An ethylene terephthalate-based thermoplastic polyester is one in which ethylene terephthalate units account for most, generally 70 mol % or more, of ester repeating units, and those having a glass transition point (Tg) in the range of 50 to 90° C. and a melting point (Tm) in the range of 200 to 275° C. are preferred. As the ethylene terephthalate-based thermoplastic polyester, polyethylene terephthalate is particularly excellent in pressure resistance, heat resistance, thermal pressure resistance, and the like, but copolymerized polyesters comprising a small amount of ester units comprising a dicarboxylic acid such as isophthalic acid or naphthalenedicarboxylic acid and a diol such as propylene glycol in addition to ethylene terephthalate units can also be used.

Specific examples of the dicarboxylic acids may include saturated aliphatic dicarboxylic acids illustrated by oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, dimer acids, and the like, or ester-forming derivatives thereof, unsaturated aliphatic dicarboxylic acids illustrated by fumaric acid, maleic acid, itaconic acid, and the like, or ester-forming derivatives thereof, aromatic dicarboxylic acids illustrated by orthophthalic acid, isophthalic acid, terephthalic acid, naphthalenedicarboxylic acids, such as 1,3-naphthalenedicarboxylic acid, 1,4-naphthalenedicarboxylic acid, 1,5-naphthalenedicarboxylic acid, 2,6-naphthalenedicarboxylic acid, and 2,7-naphthalenedicarboxylic acid, 4,4'-biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, anthracenedicarboxylic acid, and the like, or ester-forming derivatives thereof, and metal sulfonate group-containing aromatic dicarboxylic acids illustrated by 5-sodium sulfoisophthalic acid, 2-sodium sulfoterephthalic acid, 5-lithium sulfoisophthalic acid, 2-lithium sulfoterephthalic acid, 5-potassium sulfoisophthalic acid, 2-potassium sulfoterephthalic acid, and the like, or lower alkyl ester derivatives thereof.

Among the above dicarboxylic acids, particularly, terephthalic acid, isophthalic acid, and naphthalenedicarboxylic acids are preferred in terms of the physical properties of the obtained polyester, and the like. Another dicarboxylic acid may be copolymerized as required.

Specific examples of polyvalent carboxylic acids other than these dicarboxylic acids may include ethanetricarboxylic acid, propanetricarboxylic acid, butanetetracarboxylic acid, pyromellitic acid, trimellitic acid, trimesic acid, 3,4,3',4'-biphenyltetracarboxylic acid, and ester-forming derivatives thereof.

Specific examples of the glycols may include aliphatic glycols illustrated by ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol, polytetramethylene glycol, and the like, and aromatic glycols illustrated by hydroquinone, 4,4'-dihydroxybisphenol, 1,4-bis(3-hydroxyethoxy)benzene, 1,4-bis(β-hydroxyethoxyphenyl) sulfone, bis(p-hydroxyphenyl) ether, bis(p-hydroxyphenyl) sulfone, bis(p-hydroxyphenyl)methane, 1,2-bis(p-hydroxyphenyl)ethane, bisphenol A, bisphenol C, 2,5-naphthalenediol, glycols in which ethylene oxide is added to these glycols, and the like.

Among the above glycols, particularly, ethylene glycol, 1,3-propylene glycol, 1,4-butylene glycol, and 1,4-cyclohexanedimethanol are preferably used as a main component.

Specific examples of polyhydric alcohols other than these glycols may include trimethylolmethane, trimethylolethane, trimethylolpropane, pentaerythritol, glycerol, and hexanetriol.

Specific examples of the hydroxycarboxylic acids may include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, or ester-forming derivatives thereof.

Specific examples of the cyclic esters may include, ε-caprolactone, β-propiolactone, β-methyl-β-propiolactone, δ-valerolactone, glycolide, and lactide.

Specific examples of the ester-forming derivatives of polyvalent carboxylic acids and hydroxycarboxylic acids may include alkyl esters, acid chlorides, and acid anhydrides thereof.

Among those described above, polyesters in which the principal acid component is terephthalic acid or an ester-forming derivative thereof or a naphthalenedicarboxylic acid or an ester-forming derivative thereof, and the principal glycol component is an alkylene glycol are preferred.

The polyesters in which the principal acid component is terephthalic acid or an ester-forming derivative thereof are preferably polyesters containing a total of 70 mol % or more of terephthalic acid or an ester-forming derivative thereof based on all acid components, more preferably polyesters containing a total of 80 mol % or more of terephthalic acid or an ester-forming derivative thereof, and further preferably polyesters containing a total of 90 mol % or more of terephthalic acid or an ester-forming derivative thereof. Similarly, the polyesters in which the principal acid component is a naphthalenedicarboxylic acid or an ester-forming derivative thereof are preferably polyesters containing a total of 70 mol % or more of a naphthalenedicarboxylic acid or an ester-forming derivative thereof, more preferably polyesters containing a total of 80 mol % or more of a naphthalenedicarboxylic acid or an ester-forming derivative thereof, and further preferably polyesters containing a total of 90 mol % or more of a naphthalenedicarboxylic acid or an ester-forming derivative thereof.

Among the above-described naphthalenedicarboxylic acids or ester-forming derivatives thereof, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, or ester-forming derivatives thereof illustrated for the dicarboxylic acids are preferred.

The above-described polyesters in which the principal glycol component is an alkylene glycol are preferably polyesters containing a total of 70 mol % or more of an alkylene glycol based on all glycol components, more preferably polyesters containing a total of 80 mol % or more of an alkylene glycol, and further preferably polyesters containing a total of 90 mol % or more of an alkylene glycol. The alkylene glycol here may comprise a substituent or an alicyclic structure in the molecular chain.

The copolymerization component other than the above terephthalic acid/ethylene glycol is preferably at least one or more selected from the group consisting of isophthalic acid, 2,6-naphthalenedicarboxylic acid, diethylene glycol, neopentyl glycol, 1,4-cyclohexanedimethanol, 1,2-propanediol, 1,3-propanediol, and 2-methyl-1,3-propanediol and is more preferably at least one or more selected from the group consisting of isophthalic acid, diethylene glycol, neopentyl glycol, and 1,4-cyclohexanedimethanol in terms of achieving both transparency and moldability.

One preferred example of the polyester used in the oxygen absorbent composition in this embodiment is a polyester in which the principal repeating unit is composed of ethylene terephthalate, more preferably a linear polyester comprising 70 mol % or more of ethylene terephthalate units, further preferably a linear polyester comprising 80 mol % or more of ethylene terephthalate units, and particularly preferably a linear polyester comprising 90 mol % or more of ethylene terephthalate units.

Another preferred example of the polyester used in the oxygen absorbent composition in this embodiment is a polyester in which the principal repeating unit is composed of ethylene-2,6-naphthalate, more preferably a linear polyester comprising 70 mol % or more of ethylene-2,6-naphthalate units, further preferably a linear polyester comprising 80 mol % or more of ethylene-2,6-naphthalate units, and particularly preferably a linear polyester comprising 90 mol % or more of ethylene-2,6-naphthalate units.

Other preferred examples of the polyester used in the oxygen absorbent composition in this embodiment may include linear polyesters comprising 70 mol % or more of propylene terephthalate units, linear polyesters comprising 70 mol % or more of propylene naphthalate units, linear polyesters comprising 70 mol % or more of 1,4-cyclohexanedimethylene terephthalate units, linear polyesters comprising 70 mol % or more of butylene naphthalate units, or linear polyesters comprising 70 mol % or more of butylene terephthalate units.

In terms of achieving both transparency and moldability, particularly preferred polyesters are a combination of terephthalic acid/isophthalic acid/ethylene glycol, a combination of terephthalic acid/ethylene glycol/1,4-cyclohexanedimethanol, and a combination of terephthalic acid/ethylene glycol/neopentyl glycol as the combination of the entire polyester. It is needless to say that the above polyesters may comprise a small amount (5 mol % or less) of diethylene glycol produced by the dimerization of ethylene glycol during the esterification (transesterification) reaction or the polycondensation reaction.

Other preferred examples of the polyester used in the oxygen absorbent composition in this embodiment may include polyglycolic acid obtained by the polycondensation of glycolic acid or methyl glycolate or the ring-opening polycondensation of glycolide. This polyglycolic acid may be one in which another component such as lactide is copolymerized.

<Polyamide>

Examples of the polyamide used in the oxygen absorbent composition in this embodiment may include polyamides comprising a unit derived from a lactam or an aminocarboxylic acid as the main constituent unit, aliphatic polyamides comprising a unit derived from an aliphatic diamine and an aliphatic dicarboxylic acid as the main constituent unit, partially aromatic polyamides comprising a unit derived from an aliphatic diamine and an aromatic dicarboxylic acid as the main constituent unit, and partially aromatic polyamides comprising a unit derived from an aromatic diamine and an aliphatic dicarboxylic acid as the main constituent unit. The polyamide here may be one in which a monomer unit other than the main constituent unit is copolymerized as required.

Specific examples of the lactam or the aminocarboxylic acid may include lactams such as ε-caprolactam and laurolactam, aminocarboxylic acids such as aminocaproic acid and aminoundecanoic acid, and aromatic aminocarboxylic acids such as para-aminomethylbenzoic acid.

Specific examples of the aliphatic diamine may include aliphatic diamines having 2 to 12 carbon atoms or functional derivatives thereof and alicyclic diamines. The aliphatic diamine may be a linear aliphatic diamine, or a chain aliphatic diamine having a branch. Specific examples of such a linear aliphatic diamine may include aliphatic diamines such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, and dodecamethylenediamine. In addition, specific examples of the alicyclic diamines may include cyclohexanediamine, 1,3-bis(aminomethyl)cyclohexane, and 1,4-bis(aminomethyl)cyclohexane.

In addition, specific examples of the aliphatic dicarboxylic acid may include linear aliphatic dicarboxylic acids and alicyclic dicarboxylic acids. Especially, linear aliphatic dicarboxylic acids having an alkylene group having 4 to 12 carbon atoms are preferred. Examples of the linear aliphatic dicarboxylic acids may include adipic acid, sebacic acid, malonic acid, succinic acid, glutaric acid, pimelic acid, suberic acid, azelaic acid, undecanoic acid, undecanedioic acid, dodecanedioic acid, dimer acids, and functional derivatives thereof. In addition, examples of the alicyclic dicarboxylic acids may include 1,4-cyclohexanedicarboxylic acid, hexahydroterephthalic acid, and hexahydroisophthalic acid.

In addition, specific examples of the aromatic diamine may include meta-xylylenediamine, para-xylylenediamine, and para-bis(2-aminoethyl)benzene.

In addition, specific examples of the aromatic dicarboxylic acid may include terephthalic acid, isophthalic acid, phthalic acid, 2,6-naphthalenedicarboxylic acid, diphenyl-4,4'-dicarboxylic acid, diphenoxyethanedicarboxylic acid, and functional derivatives thereof.

Examples of specific polyamides may include polyamide 4, polyamide 6, polyamide 10, polyamide 11, polyamide 12, polyamide 4,6, polyamide 6,6, polyamide 6,10, polyamide 6T, polyamide 9T, polyamide 6IT, poly(meta-xylylene adipamide) (polyamide MXD6), isophthalic acid-copolymerized poly(meta-xylylene adipamide) (polyamide MXD6I), poly(meta-xylylene sebacamide) (polyamide MXD10), poly(meta-xylylene dodecanamide) (polyamide MXD12), poly 1,3-bisaminocyclohexane adipamide (polyamide BAC6), and poly(para-xylylene sebacamide) (polyamide PXD10). Examples of more preferred polyamides may include polyamide 6, polyamide MXD6, and polyamide MXD6I.

In addition, as the copolymerization component that may be copolymerized with the above polyamide, a polyether having a number average molecular weight of 2000 to 20000 having at least one terminal amino group or a terminal carboxyl group, or an organic carboxylate of the above polyether having a terminal amino group, or an amino salt of the above polyether having a terminal carboxyl group can also be used. Specific examples thereof may include bis(aminopropyl)poly(ethylene oxide) (polyethylene glycol having a number average molecular weight of 2000 to 20000).

In addition, the above partially aromatic polyamides may contain a constituent unit derived from a tri-or higher basic polyvalent carboxylic acid such as trimellitic acid or pyromellitic acid in a range in which it is substantially linear.

<Ethylene-Vinyl Alcohol Copolymer>

As the ethylene-vinyl alcohol copolymer used in the oxygen absorbent composition in this embodiment, those having an ethylene content of 15 to 60 mol % and a degree of saponification of a vinyl acetate component of 90 mol % or more are preferred. The ethylene content is preferably 20 to 55 mol %, more preferably 29 to 44 mol %. In addition, the degree of saponification of the vinyl acetate component is preferably 95 mol % or more. The ethylene vinyl alcohol copolymer may further comprise a small amount of a comonomer such as an α-olefin such as propylene, isobutene, α-octene, α-dodecene, or α-octadecene, an unsaturated carboxylic acid or a salt thereof, a partial alkyl ester, a complete alkyl ester, a nitrile, an amide, an anhydride, or an unsaturated sulfonic acid or a salt thereof.

<Plant-Derived Resin>

The plant-derived resin used in the oxygen absorbent composition in this embodiment should be a resin comprising a plant-derived substance as a raw material, and the plant that forms the raw material is not particularly limited. Specific examples of the plant-derived resin may include aliphatic polyester-based biodegradable resins. In addition, examples of the aliphatic polyester-based biodegradable resins may include poly(α-hydroxyacids) such as polyglycolic acid (PGA) and polylactic acid (PLA); and polyalkylene alkanoates such as polybutylene succinate (PBS) and polyethylene succinate (PES).

<Chlorine-Containing Resin>

The chlorine-containing resin used in the oxygen absorbent composition in this embodiment should be a resin comprising chlorine in the constituent unit, and known resins can be used. Specific examples of the chlorine-containing resin may include polyvinyl chloride, polyvinylidene chloride, and copolymers of these and vinyl acetate, maleic acid derivatives, higher alkyl vinyl ethers, or the like.

Among the above illustrated thermoplastic resins, linear low density polyethylene (LLDPE), ethylene-vinyl alcohol copolymers (EVOH), nylon 6 (PA6), polyethylene terephthalate (PET), and polyvinyl chloride (PVC) are preferably used as food packaging materials.

<Others>

The oxygen absorbent composition in this embodiment may further contain a radical-generating agent or a photoinitiator as required in order to promote the oxygen absorption reaction. Specific examples of the radical-generating agent may include various N-hydroxyimide compounds and may include, but are not particularly limited to, N-hydroxysuccinimide, N-hydroxymaleimide, N,N'-dihydroxycyclohexanetetracarboxylic acid diimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxy HET acid imide, N-hydroxyhimic acid imide, N-hydroxytrimellitic acid imide, and N,N-dihydroxypyromellitic acid diimide. In addition, specific examples of the photoinitiator may include, but are not particularly limited to, benzophenone and derivatives thereof, thiazine dyes, metal porphyrin derivatives, and anthraquinone derivatives. One of these radical-generating agents and photoinitiators can be used alone, or two or more of these radical-generating agents and photoinitiators can be used in combination.

The oxygen absorbent composition in this embodiment may contain various additives known in the industry in a range that does not impair its effect. Examples of such optional components may include, but are not particularly limited to, fillers such as calcium carbonate, clay, and mica, desiccants, pigments, dyes, antioxidants, slip agents, antistatic agents, stabilizers, plasticizers, and deodorants.

In this embodiment, a molded body comprising the above-described oxygen absorbent composition can be provided. The method for making the molded body is not particularly limited, and, for example, known methods can be adopted. Examples of the method may include, but are not particularly limited to, injection molding methods, extrusion molding methods, calender molding methods, blow molding methods, vacuum-pressure molding methods, and compression molding methods.

In this embodiment, by providing a package in which the above-described oxygen absorbent composition is blended, it can be preferably used. In other words, the package in this embodiment can be a package comprising the oxygen absorbent composition. The form of the package is not particularly limited and can be appropriately made preferred considering the application, use conditions, and the like. Such preferred examples may include a package obtained by packaging the oxygen absorbent composition in this embodiment in an air-permeable packaging material. Examples of such a package may include a small bag-like oxygen absorbent package provided by filling an air-permeable packaging material with the oxygen absorbent composition in which the compound (A) and the transition metal catalyst are supported on the support substance.

The air-permeable packaging material is not particularly limited as long as it is a packaging material used in oxygen absorbent applications, but it is preferably a packaging material having air permeability as high as possible in terms of sufficiently exerting the oxygen absorption effect. Specific examples of the air-permeable packaging material may include paper such as Japanese paper, machine-made paper, and rayon paper; nonwoven fabrics using fibers such as pulp, cellulose, and synthetic resin fibers; plastic films or perforated articles thereof; microporous films in which calcium carbonate and the like are blended and which are subjected to stretching treatment; and further, laminated films in which two or more layers selected from these are laminated.

Examples of the plastic films may include films using the above-described thermoplastic resins. Examples of the laminated films in which two or more layers are laminated may include laminated films in which a base layer of polyethylene terephthalate, a polyamide, polypropylene, a polycarbonate, or the like and a seal layer of polyethylene, an ionomer, polybutadiene, an ethylene acrylic acid copolymer, an ethylene methacrylic acid copolymer, an ethylene vinyl acetate copolymer, or the like are laminated and adhered.

EXAMPLES

The present invention will be described in more detail by the following Examples and Comparative Examples, but the present invention is not limited in any way by the following Examples. NMR measurement was performed at room temperature unless otherwise described.

Synthesis Example 1

Diimide Compound A Having Tetralin Ring

A 100 mL reactor equipped with a heating apparatus and a stirring apparatus was charged with 6.60 g (32.6 mmol) of 1,2,3,4-tetrahydronaphthalene-1,8-dicarboxylic anhydride and 1.89 g (16.3 mmol) of 1,6-diaminohexane, and the temperature was increased to 170° C. under a nitrogen atmosphere. The mixture was heated and stirred for 1 hour and then cooled to room temperature, and a diimide compound A was obtained by recrystallization.

Spectral data of diimide compound A:

$^1$H-NMR (500 MHz, CDCl$_3$) δ 7.98 (2H d), 7.30-7.36 (4H m), 3.95-4.02 (2H m), 3.85-3.91 (2H m), 3.71 (2H dd), 2.84-2.92 (4H m), 2.65-2.69 (2H m), 2.10-2.15 (2H m), 1.85-1.90 (2H m), 1.71-1.78 (2H m), 1.50-1.65 (4H m), 1.36-1.40 (4H m).

The 3% weight decrease temperature of the obtained compound was measured with measurement start temperature: 20° C., temperature increase rate: 10° C./min, and target temperature: 500° C. using a differential thermal-thermogravimetric simultaneous measurement apparatus (manufactured by SHIMADZU CORPORATION, trade name "DTG-60"). The structural formula and 3% weight decrease temperature of the obtained compound are shown in Table 1.

Synthesis Example 2

Diimide Compound B Having Tetralin Ring

A diimide compound B was obtained by performing the same operation as Synthesis Example 1 except that 1,4-diaminobutane was used instead of 1,6-diaminohexane, and its weight was 1.43 g (16.3 mmol).

Spectral data of diimide compound B:

$^1$H-NMR (500 MHz, CDCl$_3$) δ 7.98 (2H d), 7.30-7.36 (4H m), 3.95-4.02 (2H m), 3.85-3.91 (2H m), 3.71 (2H dd), 2.84-2.92 (4H m), 2.65-2.69 (2H m), 2.10-2.15 (2H m), 1.85-1.90 (2H m), 1.71-1.78 (2H m), 1.45-1.70 (4H m).

The 3% weight decrease temperature of the obtained compound was measured with measurement start temperature: 20° C., temperature increase rate: 10° C./min, and target temperature: 500° C. using a differential thermal-thermogravimetric simultaneous measurement apparatus (manufactured by SHIMADZU CORPORATION, trade name "DTG-60"). The structural formula and 3% weight decrease temperature of the obtained compound are shown in Table 1.

Synthesis Example 3

Diimide Compound C Having Tetralin Ring

A diimide compound C was obtained by performing the same operation as Synthesis Example 1 except that 1,8-diaminooctane was used instead of 1,6-diaminohexane, and its weight was 2.35 g (16.3 mmol).

Spectral data of diimide compound C:

$^1$H-NMR (500 MHz, CDCl$_3$) δ 7.98 (2H d), 7.30-7.36 (4H m), 3.95-4.02 (2H m), 3.85-3.91 (2H m), 3.71 (2H dd), 2.84-2.92 (4H m), 2.65-2.69 (2H m), 2.10-2.15 (2H m), 1.85-1.90 (2H m), 1.71-1.78 (2H m), 1.50-1.65 (4H m), 1.20-1.45 (8H m).

The 3% weight decrease temperature of the obtained compound was measured with measurement start temperature: 20° C., temperature increase rate: 10° C./min, and target temperature: 500° C. using a differential thermal-thermogravimetric simultaneous measurement apparatus (manufactured by SHIMADZU CORPORATION, trade name "DTG-60"). The structural formula and 3% weight decrease temperature of the obtained compound are shown in Table 1.

Synthesis Example 4

Tetralin Binuclear Compound D

A 500 mL reaction container equipped with a thermometer and a stirring apparatus was charged with 118.98 g (900 mmol) of tetralin and 17.3 g (180 mmol) of methanesulfonic acid, and nitrogen replacement was performed. 14.6 g of a 37% aqueous solution of formalin (180 mmol in terms of formaldehyde) was dropped from a dropping funnel at room temperature over 45 minutes. The mixture was stirred for 2 hours as it was. Then, the mixture was diluted with hexane, and then, NaHCO$_3$ water was dropped to complete the reaction. After extraction with hexane, the extract was dried with magnesium sulfate and filtered, and then, the solvent was distilled off to obtain a crude product. The tetralin was removed from the obtained crude product with a bath temperature of 150° C. and pressure: 0 torr, and then, a tetralin binuclear compound D was obtained by silica gel column chromatography.

The 3% weight decrease temperature of the obtained compound was measured with measurement start temperature: 20° C., temperature increase rate: 10° C./min, and target temperature: 500° C. using a differential thermal-thermogravimetric simultaneous measurement apparatus (manufactured by SHIMADZU CORPORATION, trade name "DTG-60"). The structural formula and 3% weight decrease temperature of the obtained compound are shown in Table 1.

TABLE 1

| | Raw material | | Product | 3% weight decrease temperature [° C.] |
|---|---|---|---|---|
| Diimide compound A | 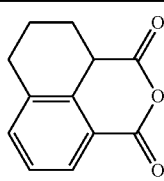 | 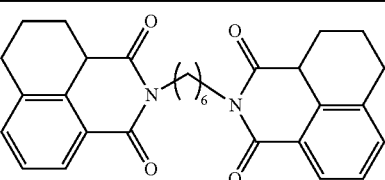 |  | 353 |
| Diimide compound B | | 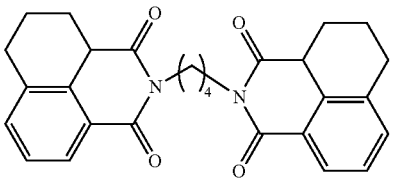 | | 321 |

TABLE 1-continued

| | Raw material | Product | 3% weight decrease temperature [° C.] |
|---|---|---|---|
| Diimide compound C | $H_2N-(-)_8-NH_2$ | (diimide structure) | 382 |
| Tetralin binuclear compound D | (tetralin), H-C(=O)-H | (tetralin binuclear structure) | 218 |

Example 1

10 Parts by mass of the diimide compound A was mixed with 90 parts by mass of polyethylene terephthalate (manufactured by Japan Unipet Co., Ltd., trade name "Unipet RT553C," hereinafter described as "PET"), and cobalt stearate was mixed with this mixture so that the amount of cobalt was 500 ppm. Then, the mixture was melted and kneaded at 260° C. to prepare an oxygen-absorbing resin composition. Next, the obtained oxygen-absorbing resin composition was hot-pressed to make a single-layer film (oxygen-absorbing molded body) having a thickness of 100 μm.

The oxygen absorption performance of the above single-layer film was evaluated by the following procedure. First, the single-layer film was cut to a size of 100 cm², and this was provided as a film sample. Next, two 24 cm×20 cm three-side-sealed bags comprising an aluminum foil-laminated film were provided. Then, the three-side-sealed bags were each filled with the obtained film sample together with 500 cc of air, and the relative humidity in one bag was adjusted to 100%, and the relative humidity in the other bag was adjusted to 30%. Then, the bags were each sealed. The sealed bodies obtained in this manner were stored at 40° C. for 14 days, and then, the oxygen concentrations in the bags were measured by an oxygen concentration meter (manufactured by Toray Engineering Co., Ltd., "LC-750F"), and the amounts of oxygen absorbed were calculated from these oxygen concentrations, respectively. In addition, the sensory evaluation of the odor before and after the storage was performed based on the criteria shown below.

For the odor before and after the storage, five testers performed sensory evaluation based on the following evaluation criteria, and the average value was described.

⊚: The composition itself had no odor, and there was no odor both before and after the storage.
○: The composition itself had some odor, but there was no change in the odor before and after the storage.
X: The odor increased after the storage.
These results are shown in Table 2.

Example 2

A single-layer film was made and the measurement of the amount of oxygen absorbed by this single-layer film and the sensory evaluation of the odor before and after storage were performed as in Example 1 except that the diimide compound B was used instead of the diimide compound A. These results are shown in Table 2.

Example 3

A single-layer film was made and the measurement of the amount of oxygen absorbed by this single-layer film and the sensory evaluation of the odor before and after storage were performed as in Example 1 except that the diimide compound C was used instead of the diimide compound A. These results are shown in Table 2.

Reference Example 1

A single-layer film was made and the measurement of the amount of oxygen absorbed by this single-layer film and the sensory evaluation of the odor before and after storage were performed as in Example 1 except that the tetralin binuclear compound D was used instead of the diimide compound A. These results are shown in Table 2.

TABLE 2

| | | Compound | | Transition metal catalyst | | Amount of oxygen absorbed[1] cc/g-film | | |
|---|---|---|---|---|---|---|---|---|
| | Thermoplastic resin | Type | Amount added (parts by mass) | Type | Amount in terms of metal (ppm) | Humidity 100% | Humidity 30% | Odor |
| Example 1 | PET | Diimide compound A | 10 | Co stearate | 500 | 8 | 3 | ⊚ |
| Example 2 | PET | Diimide compound B | 10 | Co stearate | 500 | 10 | 6 | ⊚ |
| Example 3 | PET | Diimide compound C | 10 | Co stearate | 500 | 6 | 4 | ⊚ |
| Comparative Example 1 | | Tetralin binuclear compound D | 10 | Co stearate | 500 | 1 | 0 | ⊚ |

1) the total amount of oxygen (per g of the film) absorbed during storage at a temperature of 40° C. for 14 days from the start of the test Example 4

5 Parts by mass of the diimide compound A was mixed with 95 parts by mass of a polyamide (manufactured by Mitsubishi Engineering-Plastics Corporation, trade name "Novamid X21 F07"), and cobalt stearate was dry-blended with this mixture so that the amount of cobalt was 200 ppm. Next, a film was formed by a twin-screw extruder having two screws having a diameter of 20 mm at an extrusion temperature of 250° C., a screw rotation speed of 55 rpm, a feed screw rotation speed of 19 rpm, and a take-up speed of 0.9 m/min to make a single-layer film (oxygen-absorbing molded body) having a width of 130 mm and a thickness 95 to 105 μm.

The oxygen absorption performance of the above single-layer film was evaluated by the following procedure. First, the single-layer film was cut to a size of 100 cm², and this was provided as a film sample.

Next, two 24 cm×20 cm three-side-sealed bags comprising an aluminum foil-laminated film were provided. Then, the three-side-sealed bags were each filled with the obtained film sample together with 500 cc of air, and the relative humidity in one bag was adjusted to 100%, and the relative humidity in the other bag was adjusted to 30%. Then, the bags were each sealed. The sealed bodies obtained in this manner were stored at 40° C. for 14 days, and then, the oxygen concentrations in the bags were measured by an oxygen concentration meter (manufactured by Toray Engineering Co., Ltd., "LC-750F"), and the amounts of oxygen absorbed were calculated from these oxygen concentrations, respectively. In addition, the sensory evaluation of the odor before and after the storage was performed as in Example 1.

These results are shown in Table 3.

Example 5

A single-layer film was made and the measurement of the amount of oxygen absorbed by this single-layer film and the sensory evaluation of the odor before and after storage were performed as in Example 4 except that the diimide compound B was used instead of the diimide compound A. These results are shown in Table 3.

Example 6

A single-layer film was made and the measurement of the amount of oxygen absorbed by this single-layer film and the sensory evaluation of the odor before and after storage were performed as in Example 4 except that the diimide compound C was used instead of the diimide compound A. These results are shown in Table 3.

Reference Example 2

A single-layer film was made and the measurement of the amount of oxygen absorbed by this single-layer film and the sensory evaluation of the odor before and after storage were performed as in Example 4 except that the tetralin binuclear compound D was used instead of the diimide compound A. These results are shown in Table 3.

TABLE 3

| | | Compound | | Transition metal catalyst | | Amount of oxygen absorbed[1] cc/g-film | | |
| --- | --- | --- | --- | --- | --- | --- | --- | --- |
| | Thermoplastic resin | Type | Amount added (parts by mass) | Type | Amount in terms of metal (ppm) | Humidity 100% | Humidity 30% | Odor |
| Example 4 | Polyamide | Diimide compound A | 5 | Co stearate | 200 | 4 | 3 | ◉ |
| Example 5 | | Diimide compound B | 5 | Co stearate | 200 | 6 | 4 | ◉ |
| Example 6 | | Diimide compound C | 5 | Co stearate | 200 | 3 | 2 | ◉ |
| Reference Example 2 | | Tetralin binuclear compound D | 5 | Co stearate | 200 | 2 | 1 | ◉ |

1) the total amount of oxygen (per g of the film) absorbed during storage at a temperature of 40° C. for 14 days from the start of the test Example 7

750 Parts by mass of a silica sol (manufactured by Nissan Chemical Industries, Ltd., trade name "MEK-ST 40D," containing 60% by mass of methyl ethyl ketone) and cobalt 2-ethylhexanoate were added to 100 parts by mass of the diimide compound A so that the amount of cobalt was 0.4 parts by mass. The mixture was stirred under a nitrogen atmosphere at 70° C. for 1 hour, and then, the methyl ethyl ketone was distilled off under reduced pressure followed by powderization to make a particulate material (composition).

Next, two gas barrier bags comprising an aluminum foil-laminated film were provided. Then, the gas barrier bags were each filled with 1 g of the obtained particulate material together with 500 cc of air, and the relative humidity in one bag was adjusted to 100%, and the relative humidity in the other bag was adjusted to 30%. Then, the bags were each sealed. The sealed bodies obtained in this manner were stored at 23° C. for 30 days, and the total amount of oxygen absorbed during this time was measured.

For the odor before and after the storage, five testers performed sensory evaluation based on the following evaluation criteria, and the average value was described.

◉: The composition itself had no odor, and there was no odor both before and after the storage.

○: The composition itself had some odor, but there was no change in the odor before and after the storage.

X: The odor increased after the storage.

These measurement results are shown in Table 4.

Example 8

The measurement of the amount of oxygen absorbed and the sensory evaluation of the odor before and after storage were performed as in Example 7 except that the amount of cobalt was 0.16 parts by mass. These results are shown in Table 4.

Example 9

The measurement of the amount of oxygen absorbed and the sensory evaluation of the odor before and after storage were performed as in Example 7 except that the amount of cobalt was 1.0 part by mass. These results are shown in Table 4.

Example 10

The measurement of the amount of oxygen absorbed and the sensory evaluation of the odor before and after storage were performed as in Example 7 except that Mn 2-ethylhexanoate was used instead of Co 2-ethylhexanoate for the catalyst. These results are shown in Table 4.

Example 11

The measurement of the amount of oxygen absorbed and the sensory evaluation of the odor before and after storage were performed as in Example 7 except that Fe 2-ethylhexanoate was used instead of Co 2-ethylhexanoate for the catalyst. These results are shown in Table 4.

Example 12

The measurement of the amount of oxygen absorbed and the sensory evaluation of the odor before and after storage were performed as in Example 7 except that the diimide compound B was used instead of the diimide compound A. These results are shown in Table 4.

Example 13

The measurement of the amount of oxygen absorbed and the sensory evaluation of the odor before and after storage were performed as in Example 1 except that the diimide compound C was used instead of the diimide compound A. These results are shown in Table 4.

only did the composition itself have no odor, but also there was no odor before and after oxygen absorption.

This application is based on Japanese Patent Application No. 2013-044756 filed with the Japan Patent Office on Mar. 6, 2013, the contents of which are incorporated herein by reference.

INDUSTRIAL APPLICABILITY

According to the present invention, it is possible to realize an oxygen absorbent composition and a package using the same that have excellent oxygen absorption ability under a wide range of humidity conditions from low humidity to high humidity and can suppress also an increase in odor intensity after oxygen absorption. Therefore, they can be used in wide applications regardless of the object, for example, foods, cooked foods, drinks, medicines, and health foods.

What is claimed is:

1. An oxygen absorbent composition comprising
   a compound (A) having two or more tetralin rings, at least one of the tetralin rings having a hydrogen atom bonded to a benzylic position thereof, and having two or more imide bonds, and
   a transition metal catalyst,
   wherein the compound (A) is at least one compound selected from a group consisting of the following general formulas (1) to (4):

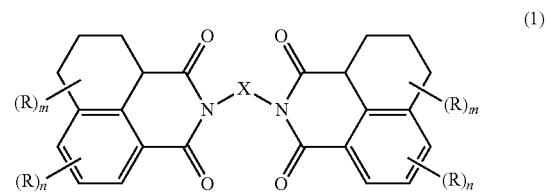

TABLE 4

| | Compound | Supporting substance | Transition metal catalyst | | Supporting substance | Amount of oxygen absorbed[1] cc/g-agent | | Amount of oxygen absorbed[2] cc/g-Compound | | Odor |
| | | | Metal type | Amount in terms of metal | | Humidity 100% | Humidity 30% | Humidity 100% | Humidity 30% | |
|---|---|---|---|---|---|---|---|---|---|---|
| Example 7 | Diimide compound A | Silica | Co | 0.4 | 300 | 14 | 3 | 57 | 14 | ◎ |
| Example 8 | Diimide compound A | Silica | Co | 0.16 | 300 | 8 | 4 | 30 | 15 | ◎ |
| Example 9 | Diimide compound A | Silica | Co | 1.0 | 300 | 13 | 3 | 51 | 12 | ◎ |
| Example 10 | Diimide compound A | Silica | Mn | 0.4 | 300 | 11 | 4 | 43 | 16 | ◎ |
| Example 11 | Diimide compound A | Silica | Fe | 0.4 | 300 | 12 | 3 | 48 | 13 | ◎ |
| Example 12 | Diimide compound B | Silica | Co | 0.4 | 300 | 22 | 6 | 88 | 23 | ◎ |
| Example 13 | Diimide compound C | Silica | Co | 0.4 | 300 | 12 | 5 | 49 | 21 | ◎ |

1) the total amount of oxygen (per g of the oxygen absorbent) absorbed during storage at a temperature of 23° C. for 30 days from the start of the test
2) the total amount of oxygen (per g of the compound having a tetralin ring) absorbed during storage at a temperature of 23° C. for 30 days from the start of the test As is also clear from Table 2, Table 3, and Table 4, it was confirmed that each of the Examples had excellent oxygen absorption performance both under high humidity and under low humidity, and maintained oxygen absorption performance even after being subjected to a thermal history. Further, it was confirmed that in each of the Examples, not -continued

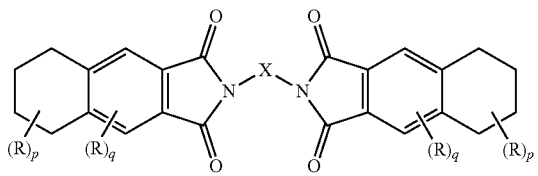

-continued

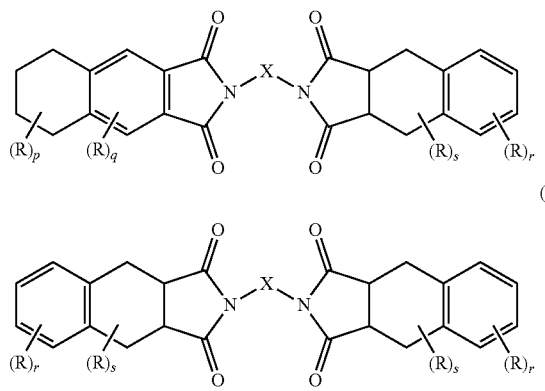

(3)

(4)

wherein R each independently represents a hydrogen atom or a monovalent substituent, the monovalent substituent is at least one selected from a group consisting of a halogen atom, an alkyl group, an alkenyl group, an alkynyl group, an aryl group, a heterocyclic group, a cyano group, a hydroxy group, a carboxyl group, an ester group, an amide group, a nitro group, an alkoxy group, an aryloxy group, an acyl group, an amino group, a thiol group, an alkylthio group, an arylthio group, a heterocyclic thio group, and an imide group, and R may further have a substituent; m represents an integer of 0 to 6, n represents an integer of 0 to 3, p represents an integer of 0 to 7, q represents an integer of 0 to 2, r represents an integer of 0 to 4, s represents an integer of 0 to 5, and in at least one tetralin ring, one or more hydrogen atoms are bonded to a benzylic position thereof; and X represents a divalent substituent, and the divalent substituent is at least one selected from a group consisting of an aromatic hydrocarbon group, a saturated or unsaturated alicyclic hydrocarbon group, a linear or branched, saturated or unsaturated aliphatic hydrocarbon group, and a heterocyclic group.

2. The oxygen absorbent composition according to claim 1, further comprising a support substance.

3. The oxygen absorbent composition according to claim 2, wherein the support substance is at least one selected from a group consisting of calcium silicate, diatomaceous earth, silica, and activated carbon.

4. The oxygen absorbent composition according to claim 2, wherein 10 to 1000 parts by mass of the support substance is contained based on 100 parts by mass of the compound (A).

5. The oxygen absorbent composition according to claim 1, wherein the transition metal catalyst comprises at least one transition metal selected from a group consisting of manganese, iron, cobalt, nickel, and copper.

6. The oxygen absorbent composition according to claim 1, wherein the transition metal catalyst is contained with an amount of the transition metal being 0.001 to 10 parts by mass based on 100 parts by mass of the compound (A).

7. The oxygen absorbent composition according to claim 1, further comprising a thermoplastic resin.

8. A molded body comprising the oxygen absorbent composition according to claim 7.

9. A package obtained by packaging the oxygen absorbent composition according to claim 1 in an air-permeable packaging material.

* * * * *